Aug. 4, 1925.

H. SEBELL

AUTOMOBILE SEAT BED

Filed Feb. 9 1924

Inventor.
Harry Sebell
by Heard Smith Tennant
Attys

Aug. 4, 1925.
H. SEBELL
1,548,334
AUTOMOBILE SEAT BED
Filed Feb. 9 1924     2 Sheets-Sheet 2
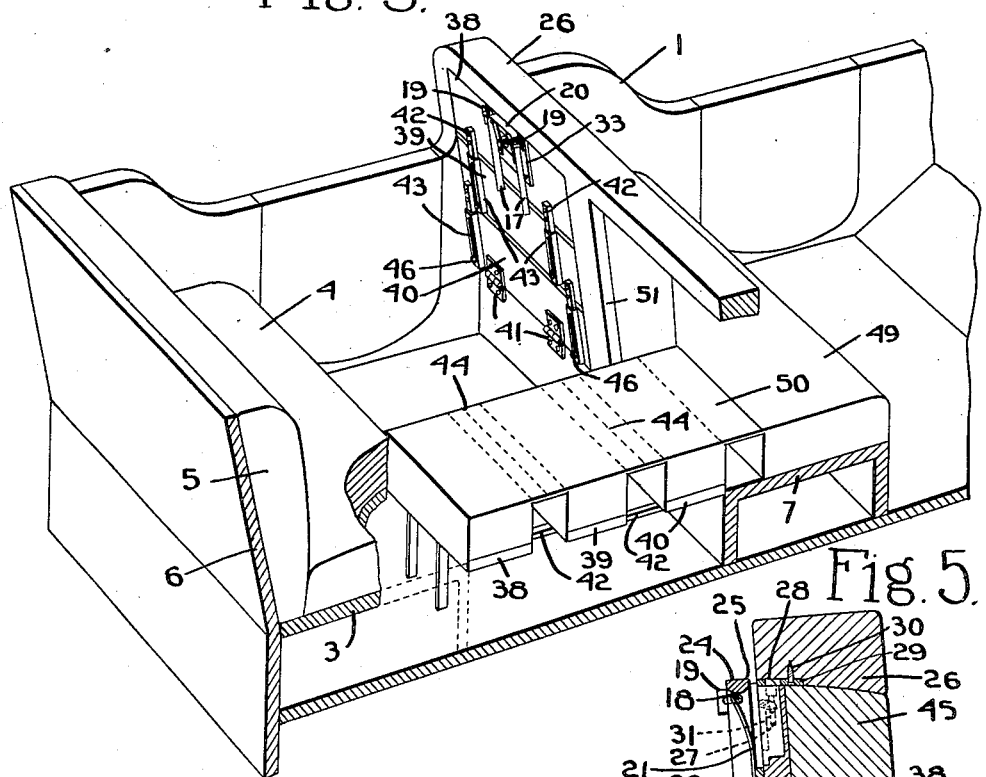
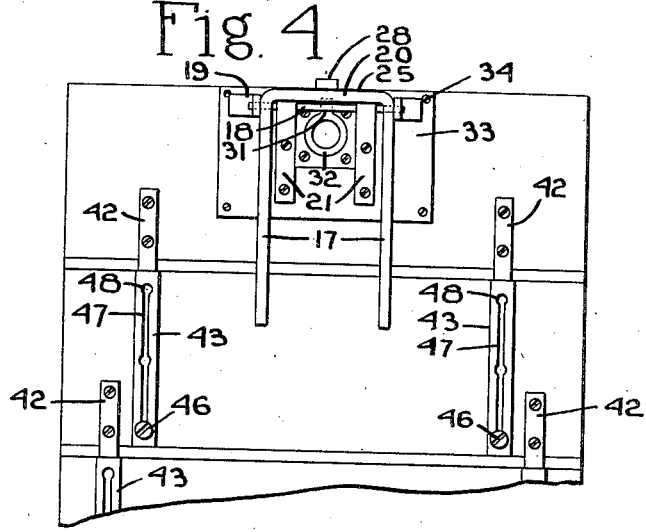
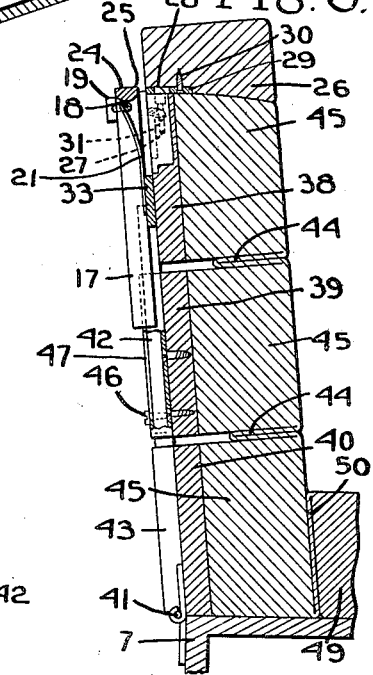
Inventor.
Harry Sebell
by Attys.

Patented Aug. 4, 1925.

1,548,334

UNITED STATES PATENT OFFICE.

HARRY SEBELL, OF BOSTON, MASSACHUSETTS.

AUTOMOBILE SEAT BED.

Application filed February 9, 1924. Serial No. 691,786.

*To all whom it may concern:*

Be it known that I, HARRY SEBELL, a citizen of the United States, and resident of Boston, county of Suffolk, State of Massachusetts, have invented an Improvement in Automobile Seat Beds, of which the following description, in connection with the accompanying drawing, is a specification, like characters on the drawing representing like parts.

This invention relates to a seat bed for an automobile or other vehicle and the general object of the invention is to provide a device by which the seat of an automobile or other vehicle may be converted into a bed or a portion of the seat converted into an auxiliary seat.

Another object of the invention is to provide a vehicle with a seat which may be converted into a bed the length of which may be varied.

A further object of the invention is to provide a vehicle having front and rear seats with means to convert the front seat or a portion thereof into either an auxiliary seat or a bed with or without utilizing the rear seat.

A still further and more particular object of the invention is to provide an auto having front and rear seats, with a back for the front seat which may be swung from its upright position, in which it serves as a back, to a horizontal position and then moved partially or wholly to bridge the space between the seat portions of the front and rear seats to form a horizontal seat or a short bed and permit use of the rear seat as a seat if said space is only partially bridged or to form a full length bed in conjunction with the rear seat if said space is entirely bridged.

Other objects and features of the invention will more fully appear from the following description and the accompanying drawings and will be particularly pointed out in the claims.

In the drawings;

Fig. 3 is a perspective view of the interior portion of the body of an automobile showing another form of the invention and showing the back of the front seat entirely bridging the space between the front and rear seats;

Fig. 4 is a rear view of a portion of the back of the front seat with the invention applied showing the means for locking said back in its upright position, means for supporting the back in its horizontal position and the extensible connections by which the back may be moved to bridge partially or entirely the space between the front and rear seats;

Fig. 5 is a vertical section through the back of the front seat shown in Fig. 3 when in upright position.

Figure 1:
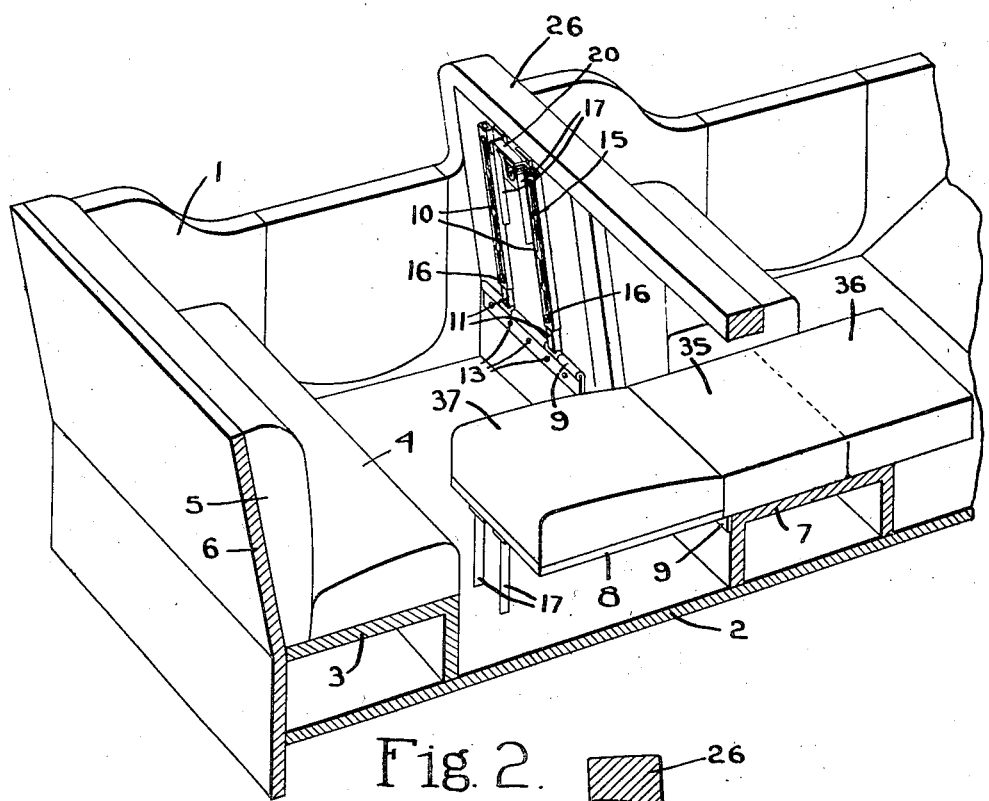
Fig. 1 is a perspective view of the interior portion of the body of an automobile showing one form of the invention and showing the back of the front seat only partially bridging the space between the front and rear seats to form an auxiliary seat or a short bed and still permit the use of the rear seat as a seat.

For purposes of illustrating the invention and the manner in which it may be applied to and utilized in connection with an automobile, I have shown in the drawings an automobile having the usual body 1, flooring 2, and rear seat which includes the frame 3 for the seat, the seat cushion 4 and the back cushion 5 which may be permanently or removably fastened to the rear portion 6 of the body.

The invention in its broad aspect consists in the provision in an automobile or other vehicle of a back for the front seat which is normally held in an upright position to serve as a seat back but which may be swung from its upright or normal position into a horizontal position to lie in the space between the front and rear seats and serve as an auxiliary seat or bed. The swinging back of the front seat and associated parts are particularly designed so that when the back is in horizontal position it may be adjusted partially or entirely to bridge the space between the front and rear seats in order that a short or a full length bed may be formed as desired and if only the short length bed is formed there is sufficient space between the end of the bed formed by the down-turned back of the front seat and the seat portion of the rear seat to permit a person to sit on the rear seat with leg room between the end of the bed and the rear seat.

Figure 2:
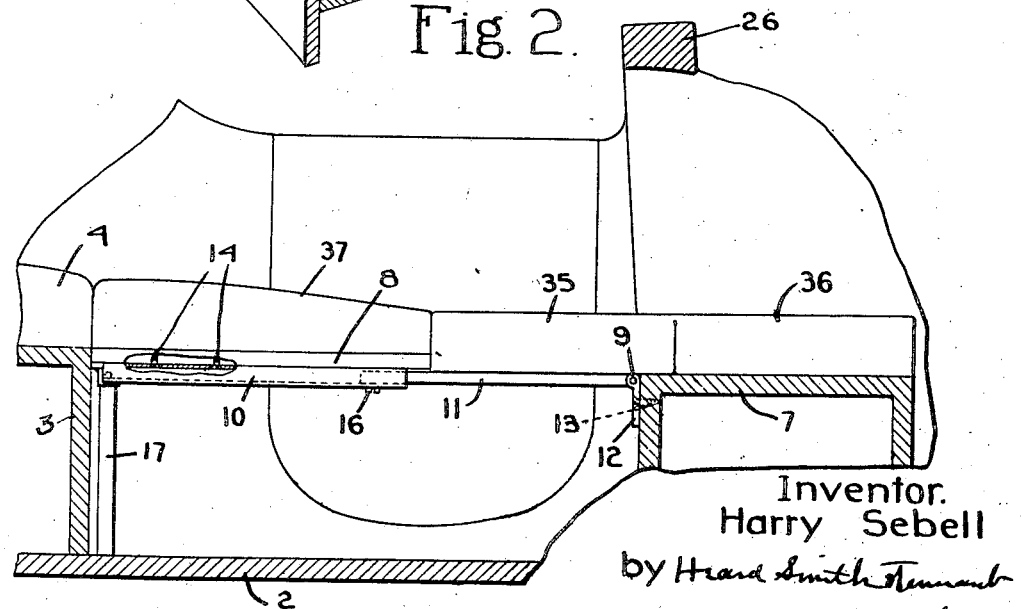
Fig. 2 is a vertical section through the body of an automobile having applied the form of the invention shown in Fig. 1 showing the back of the front seat entirely bridging the space between the front and rear seats to form a full length bed in connection with the rear seat.

The invention comprises a rigid base member 7 for the front seat and a movable member 8 which, in the embodiment of the invention illustrated in Figs. 1 and 2, is shown as a unitary back for each of the two front seats. The movable member or back is connected to the base member by extensible hinged connections to permit the movable member to be swung relatively to and moved toward or away from the rigid base member 7. Still referring to Figs. 1 and 2, the extensible hinged connections by which the back of the front seat is connected to the rigid base member of the front seat comprise a hinge 9 to permit the swinging movement of the movable member and co-operating extensible members 10 and 11 to permit movement of the back toward or from the rigid base member.

The hinge is fastened to the base 7 by a wing 12 and screws 13 and is connected to the back through the extensible members 10 and 11 one of which forms a part of the hinge to permit the swinging of the movable member and the other of which is fastened to the back 8 of the front seat in any suitable manner as by screws 14.

It has been found convenient to form as a bar the extensible member which is fastened to the hinge and to form the co-operating extensible member 10 as a sleeve which embraces the bar and is fastened to the back of the front seat by the screws 14. The bar 11 is freely slidable within the sleeve 10 to permit the easy movement of the movable member toward and from the rigid base member.

In order to prevent movement of the movable member to such a distance that it more than bridges the distance between the front and rear seats and to prevent the separation of the extensible members 10 and 11, the sleeve 10 is provided with a slot 15 which stops at such a distance from that end of the sleeve which is adjacent the hinge that a projection such as the screw 16 screwed into the bar 11 and projecting through the slot, will engage the end of the slot and prevent further movement of the movable member away from the fixed member when the movable member has been moved from the fixed member the amount required to enable the end of the movable member to meet the seat portion of the rear seat. To enable the screws 14 readily to be inserted in their correct positions the slot 15 has spaced enlargements 16 which lie directly over the heads of the screws 14 to enable a screw driver to be inserted into the sleeve to drive the screws.

In order to support the end of the movable member when in horizontal position supporting means are fastened to that end of the movable member which is removed from the hinge 9. The supporting means are preferably legs 17 hinged on a hinge rod 18 which is supported at its ends by brackets 19. The legs may be formed from a single bar of metal having a bridging portion 20 connecting the legs. To hold the legs tightly against the back when the back is in its upright position springs 21 are fastened at one end to the back with their free ends 22 engaging the hinge rod 18 and the openings in the brackets in which the ends of the hinge rod 18 are supported are slots 23 of such a length that the legs are permitted to lie closely against the surface of the movable member, the springs 21 holding the legs in this position to prevent vibration of the legs and rattling. To hold the legs in a position at right angles to the surface of the movable member in position to support the movable member when it is in bed-forming position, the upper surface 24 of the bridging portion 20 is flattened so that when the legs are in position at right angles to the surface of the movable member the flat side of the bridging member rests against the surface of the movable member and is held in that position by the force of the springs 21 and the fact that to move the legs from the position at right angles to the surface of the movable member into the position parallel with the surface of the movable member, the hinge rod 18 must move to the outer end of the slot against the action of the springs 21 as the edge 25 of the flat surface 24 rides along the surface of the movable member.

The movable member or back of the front seat is retained in its upright position by a retaining member above the movable member and locking means for locking the movable member to the retaining member. The retaining member may be, and preferably is, a strut 26 extending transverse of the body of the automobile above the back of the front seat fastened to and joining and bracing the sides of the body. The locking means may conveniently be a spring-actuated bolt 27 having an end 28 which co-operates with an opening in a locking plate 29 fastened in any suitable manner as by screws 30 in the retaining member 26. A bolt actuating lever 31, which may have an ornamental finger hold 32 fastened to it, actuates the bolt against the action of the spring to withdraw the end 28 of the bolt from the opening in the locking plate 29 to permit the movable member to be disconnected from the retaining member. If desired the legs or other means for supporting the movable member in horizontal position and the means for locking the movable member in its upright position to the retaining member may be carried by a polished metal plate 33 on which the supporting means and locking means are assembled and fastened as a unit by screws 34 to the surface of the movable member.

If the form of the invention illustrated in Figs. 1 and 2 is used the seat cushion for the front seat is preferably made in two parts 35 and 36 so that when the movable member is swung into horizontal position and moved away from the front seat, the part 35 of the cushion may be turned back to rest upon the bars 13 of the extensible connections to provide a soft mattress in connection with the cushion 37 of the back of the front seat and the part 36. The part 35 bridges the opening between the cushion 37 and the cushion 36 to provide a level mattress. If the movable member is not drawn away from the rigid base member to tightly bridge the space between the front and rear seats as shown in Fig. 1 the part 36 of the cushion may extend over the end of the base member.

The form of the invention illustrated in Figs. 3, 4 and 5 embodies the same broad features as the form illustrated in Figs. 1 and 2 but instead of having a unitary back or movable member, the movable member is divided into sections 38, 39 and 40. In this form the lowest section 40 is connected directly to the rigid base member 7 by hinges 41 so that although the section 40 may have swinging movement relative to the rigid base member it does not move toward or from said base member. The movement toward or away from the front and rear seats to bridge the space between said seats is obtained by providing extensible connections between the sections of the movable member similar to the extensible connections shown in Figs. 1 and 2 for connecting the movable member to the rigid base member. In the case of the sectional movable member, however, the extensible connections are of necessity smaller than the connections used with the unitary movable member. Bars 42 similar to the bars 11 but of shortened length co-operate with sleeves 43 similar to the sleeves 10 to permit relative movement of the sections of the movable member.

When the seat back is in its horizontal position and is extended as shown in Fig. 3 the amount to which it is extended in order to reach to the back seat 4 is divided into a plurality of relatively narrow spaces which exist between the separate sections. These narrow spaces are bridged by portions 44 of the upholstery material, said portions forming connections between the sections of the seat back. When the seat back or movable member is extended, therefore, an unbroken mattress surface is provided. When the seat back is contracted the bridging portions 44 of the upholstery are folded in between the sections 45 as shown in Fig. 5. To prevent the sections of the movable member from being pulled so far apart that the portions 44 of the upholstery are likely to tear, the bars 42 are provided with projections such as screws 46 to move through the slots 47 formed in the sleeves 43 which slots end at such a point 48 that before the portions 44 of the upholstery have been so stretched that they would be likely to tear, the projections 46 have engaged the ends of the slot 48 to prevent the movement of the sections which would cause the tearing of the upholstery. The opening between the section 40 of the movable member and the seat cushion 49 of the front seat is bridged by a portion 50 of the upholstery similar to the portion 44 which, when the movable member is in upright position, lies between the lowest sectional cushion 45 of the movable member and the seat cushion 49 as clearly shown in Fig. 5 of the drawings.

In the preferred forms of the invention and as illustrated herein the back of the front seat is divided by the upright 51 forming two movable members in order that a bed or auxiliary seat may be formed from one part of the back of the front seat while the other part of said seat back is in upright position and serving as a seat back. Such construction is not absolutely necessary, however, as the back of the front seat may be made into as many movable members as desired in accordance with the wishes of the designers of the automobile.

Having thus described the invention what is claimed as new and desired to be secured by Letters Patent is:

1. In an automobile, the combination with a rigid seat base, of a cushion member thereon, a movable member hingedly connected to the base and adapted to be swung from an upright into a horizontal position in alinement with said cushion member, said movable member comprising a plurality of sections capable of having a rectilinear movement toward and from each other thereby to extend said movable member when it is in horizontal position, said member when so extended presenting relatively narrow spaces between the sections, means connecting said sections and bridging said spaces, and means to support the movable member in its horizontal extended position.

2. In an automobile, the combination with a rigid seat base, of a cushioned member thereon, a movable back for the seat hingedly connected to the base and adapted to be swung from an upright position into a horizontal position in alinement with said cushion member, said movable back comprising a plurality of connected sections capable of movement toward and from each other in the plane of the back thereby to extend or contract said back, said back when extended presenting relatively narrow spaces between the sections thereof, the means connecting said sections bridging said spaces, and means to support the back in its horizontal extended position.

3. In an automobile, the combination with a rigid seat base, of a cushion member thereon, a movable seat back hingedly connected to the base and adapted to be swung from an upright position into a horizontal position in alinement with said cushion member, said seat back being divided transversely to present a plurality of separable sections, flexible means connecting and bridging said sections and permitting movement of said sections toward and from each other in the plane of the back thereby to extend or contract said member, a retaining member to hold the seat back in its upright position when it is contracted, and means to support the back in its horizontal extended position.

4. In an automobile, the combination with a rigid seat base, of a cushion member thereon, a movable seat back hingedly connected to the base and adapted to be swung from an upright position into a horizontal position in alinement with said cushion member, said movable back being divided transversely into a plurality of sections that are movable toward and from each other in the plane of the back, flexible means connecting and bridging said sections, a retaining member to hold the seat back in its upright position, means to lock the seat back to the retaining member, and means for supporting the seat back in its horizontal position when extended.

In testimony whereof, I have signed my name to this specification.

HARRY SEBELL.